United States Patent
Wang et al.

(10) Patent No.: US 11,201,398 B2
(45) Date of Patent: Dec. 14, 2021

(54) ANTENNA DEVICE AND METHOD FOR DETERMINING RADIATION PATTERN

(71) Applicant: NANNING FUGUI PRECISION INDUSTRIAL CO., LTD., Nanning (CN)

(72) Inventors: Ying-Chieh Wang, New Taipei (TW); Yi-Hao Chang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 95 days.

(21) Appl. No.: 16/665,261

(22) Filed: Oct. 28, 2019

(65) Prior Publication Data
US 2021/0126361 A1    Apr. 29, 2021

(51) Int. Cl.
| H01Q 3/26 | (2006.01) |
| H01Q 21/29 | (2006.01) |
| H04B 17/318 | (2015.01) |
| H04B 17/10 | (2015.01) |
| H01Q 3/24 | (2006.01) |

(52) U.S. Cl.
CPC ............. H01Q 3/26 (2013.01); H01Q 3/24 (2013.01); H01Q 21/29 (2013.01); H01Q 21/293 (2013.01); H04B 17/102 (2015.01); H04B 17/318 (2015.01)

(58) Field of Classification Search
CPC ........ H01Q 3/26; H01Q 21/293; H01Q 21/29; H01Q 3/24; H04B 17/318; H04B 17/103
USPC ......................................... 343/703
See application file for complete search history.

(56) References Cited

U.S. PATENT DOCUMENTS

| 5,325,403 A * | 6/1994 | Siwiak ............... | H04B 7/082 329/308 |
| 5,446,922 A * | 8/1995 | Siwiak ............... | H04B 7/0811 455/277.2 |
| 6,018,651 A * | 1/2000 | Bruckert ............. | H04B 7/0857 455/277.1 |
| 6,330,433 B1 * | 12/2001 | Jager ................ | H04B 7/0808 455/135 |
| 2008/0272840 A1 * | 11/2008 | Broyde .............. | H03F 3/347 330/124 R |

(Continued)

FOREIGN PATENT DOCUMENTS

TW    201935771    9/2019

*Primary Examiner* — Hai V Tran
(74) *Attorney, Agent, or Firm* — ScienBiziP, P.C.

(57) ABSTRACT

An antenna device includes a first antenna group comprising multiple antennas, configured to receive and transmitting signals; a second antenna group comprising multiple antennas, configured to receive and transmitting signals; a processor coupled to the first antenna group by a first electronic switch, coupled to the second antenna group by a second electronic switch, configured to divide radiation pattern of antenna combination of the first antenna group and the second antenna group into a predetermined number of characteristic patterns, and further configured to calculate similarities of the characteristic patterns and the RSSI of each characteristic pattern; wherein when the antenna device is in operation, the processor reads and analyzes RSSI of the signals, and compares with the RSSI of the characteristic patterns, and then determines the matched characteristic pattern group according to results of the comparisons and the similarities of the characteristic patterns.

10 Claims, 4 Drawing Sheets

(56) References Cited

U.S. PATENT DOCUMENTS

| | | | |
|---|---|---|---|
| 2010/0144300 A1* | 6/2010 | Someya | H01Q 1/273 |
| | | | 455/233.1 |
| 2010/0246725 A1* | 9/2010 | Okuyama | H01Q 1/273 |
| | | | 375/340 |
| 2012/0122414 A1* | 5/2012 | Noguchi | H04B 7/0874 |
| | | | 455/226.2 |
| 2016/0049924 A1* | 2/2016 | Broyde | H03J 1/0008 |
| | | | 343/745 |
| 2016/0241279 A1* | 8/2016 | Yang | H04B 1/0475 |

* cited by examiner

ANTENNA DEVICE AND METHOD FOR DETERMINING RADIATION PATTERN

FIELD

The subject matter herein generally relates to antenna field, and particularly to an antenna device and a method for determining radiation pattern.

BACKGROUND

Most of the traditional antenna field design is fixed. Environment changes can cause deterioration of the radiation pattern, resulting in a decrease in transmission performance, which is inconvenient for the user.

BRIEF DESCRIPTION OF THE DRAWINGS

Implementations of the present technology will now be described, by way of embodiment, with reference to the attached figures.

DETAILED DESCRIPTION

Figure 1:
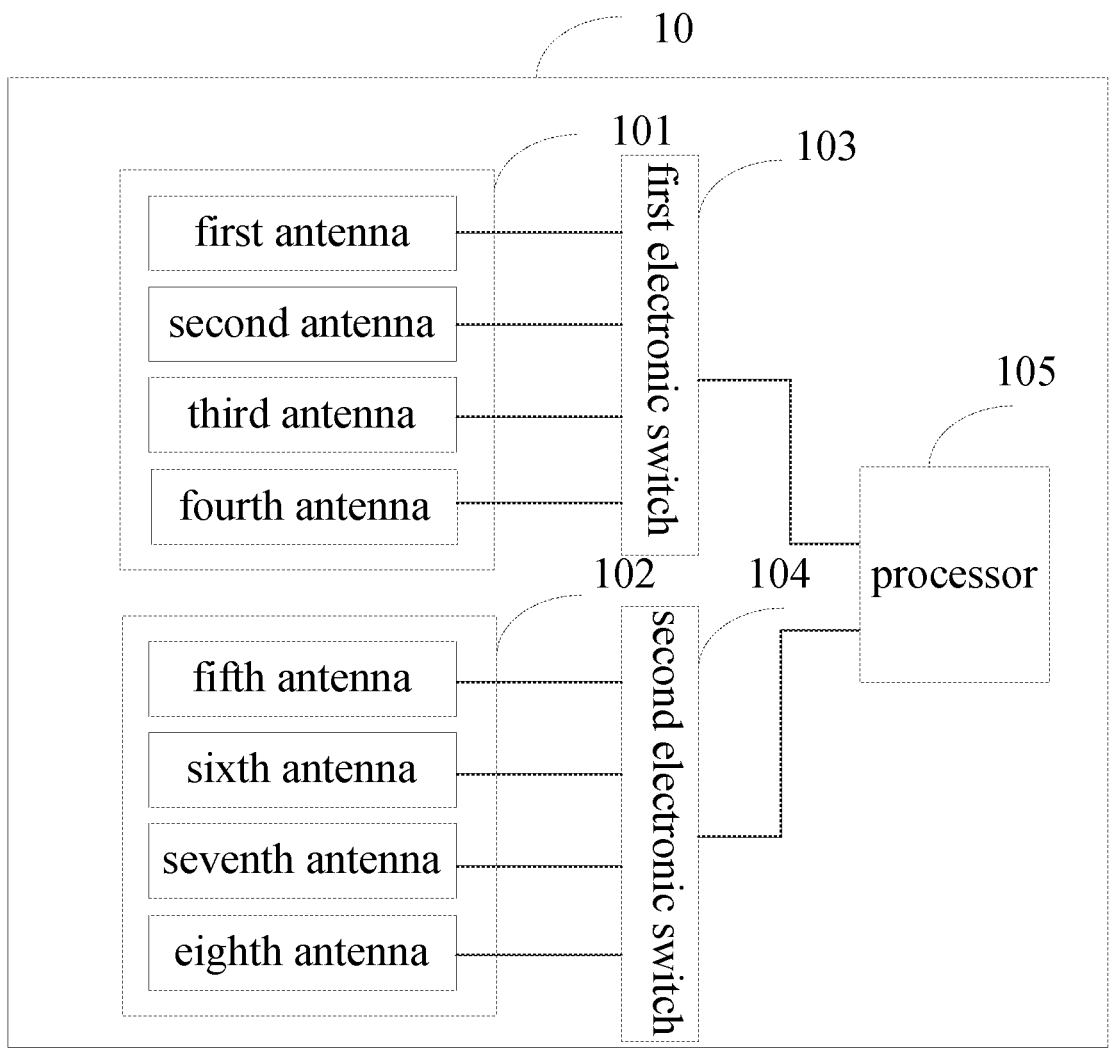
FIG. 1 is a block diagram of a first embodiment of an antenna device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a first embodiment of an antenna device 10. In at least one embodiment, the antenna device 10 comprises a first antenna group 101, a second antenna group 102, a first electronic switch 103, a second electronic switch 104, and a processor 105. The first antenna group 101 comprises multiple antennas, each antenna can receive signal and transmit signal. The second antenna group 102 comprises multiple antennas, each antenna can receive signal and transmit signal. The processor 105 is coupled to the first antenna group 101 by a first electronic switch 103, and coupled to the second antenna group 102 by a second electronic switch 104.

In at least one embodiment, the first antenna group 101 comprises four antennas (four shown as a non-limiting example), the second antenna group 102 comprises four antennas (four shown as a non-limiting example). Both the first antenna group 101 and the second antenna group 102 comprise a first end, a second end, a third end, a fourth end and a control end. The first end, the second end, a third end and the fourth end of the first electronic switch 103 are coupled to the four antennas of the first antenna group 101 respectively. The control end of the first electronic switch 103 is coupled to the processor 105. The first end, the second end, a third end and the fourth end of the second electronic switch 104 are coupled to the four antennas of the second antenna group 102 respectively. The control end of the second electronic switch 104 is coupled to the processor 105. The processor 105 controls the first electronic switch 103 to couple one or more antennas of the first antenna group 101, and control the second electronic switch 104 to couple one or more antennas of the second antenna group 102. Different antenna combinations of the first antenna group 101 and the second antenna group 102 generate different radiation patterns. For example, both the first antenna group 101 and the second antenna group 102 comprises four antennas, then will generate $(C_4^1+C_4^2+C_4^3+C_4^4)*(C_4^1+C_4^2+C_4^3+C_4^4)*4=900$ antenna combinations, that will generate 900 types of radiation pattern.

Generally, environment changes can cause deterioration of the radiation pattern, resulting in a decrease in transmission performance. Therefore the processor 105 control the first electronic switch 103 and the second electronic switch 104 to couple different antenna combination in accordance with different environment to select the optimal radiation pattern to achieve the best transmission path.

Figure 2:
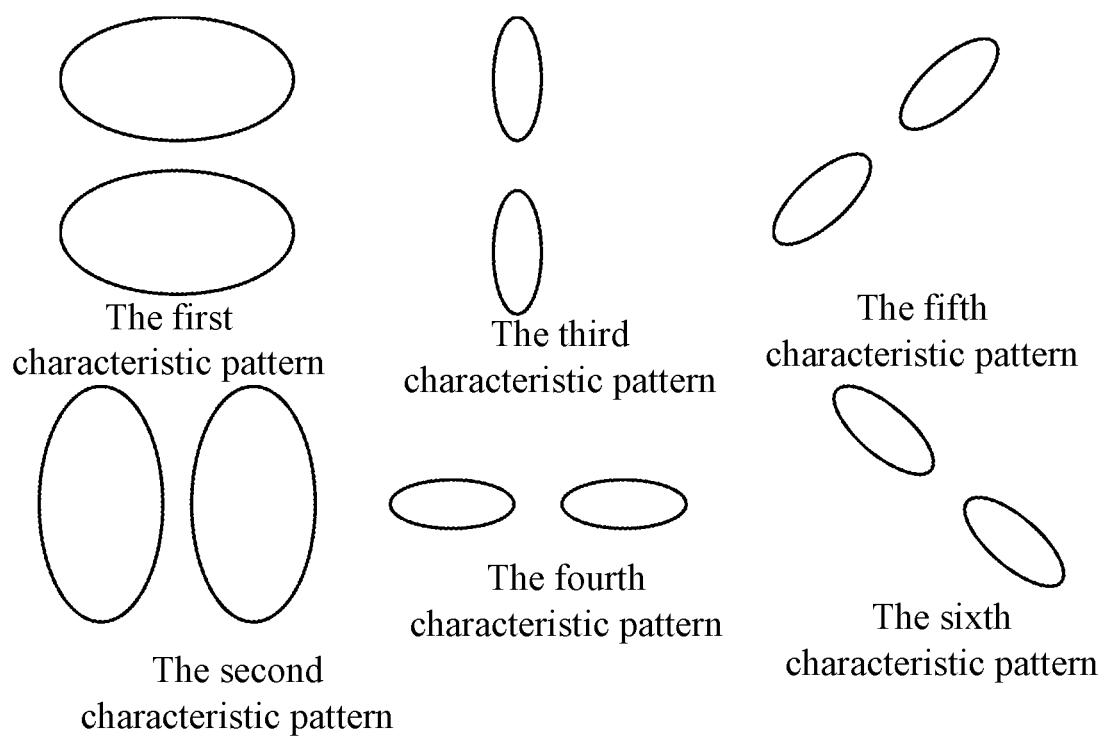
FIG. 2 is a schematic diagram of 6 types of characteristic pattern.

In at least one embodiment, in order to determine the optimal radiation pattern matching the current environment, the processor 105 divides the 900 types of radiation pattern into a predetermined number of characteristic patterns. In at least one embodiment, the processor 105 divides the 900 types of radiation pattern into 6 types of characteristic patterns. As shown in FIG. 2, FIG. 2 is a schematic diagram of 6 types of characteristic pattern.

In at least one embodiment, the processor 105 calculates similarities of the characteristic patterns and the RSSI of each characteristic pattern. When the antenna device 10 is in operation, the processor 105 reads and analyzes RSSI of the signals received by the first antenna group 101 and the second antenna group 102, and compares the RSSI of the signals of the first antenna group and the second antenna group with the RSSI of the characteristic patterns, and then determines the matched characteristic pattern group according to results of the comparisons and the similarities of the characteristic patterns. The processor 105 further calculates a number of antenna combinations corresponding to each matched characteristic pattern. The matched characteristic pattern with the largest number of antenna combinations is the optimal radiation pattern.

In other embodiment, the processor 105 further calculates the RSRQ and RSRP of each characteristic pattern, and further reads and analyzes RSRQ and RSRP of the signals received by the first antenna group 101 and the second antenna group 102, and compares with the RSRQ, RSRP and RSSI of the characteristic patterns, and then determines the matched characteristic pattern group according to results of the comparisons and the similarities of the characteristic patterns.

In at least one embodiment, when the optimal radiation pattern is determined, the processor 105 controls the first electronic switch 103 to couple to corresponding antenna of the first antenna group 101 according to the optimal radiation pattern, and controls the second electronic switch 104 to couple to corresponding antenna of the second antenna group 102 according to the optimal radiation pattern.

Figure 3:
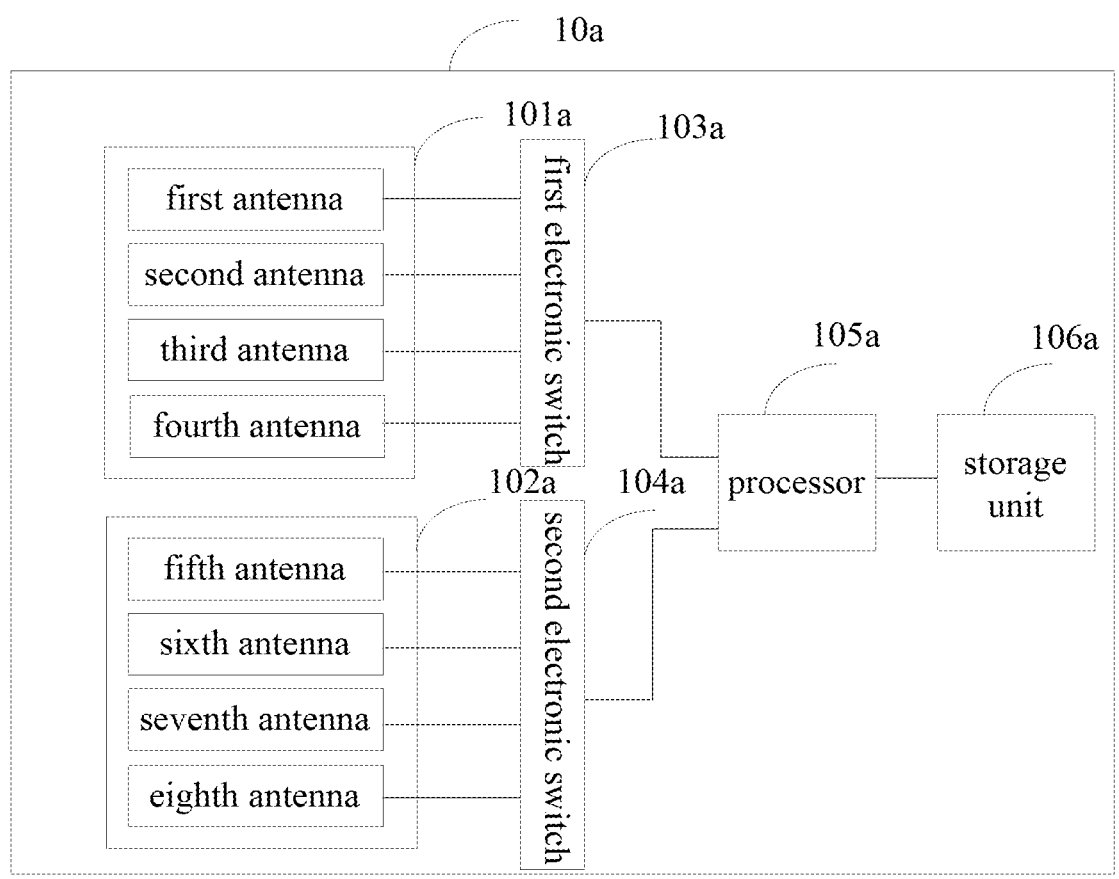
FIG. 3 is a block diagram of a second embodiment of an antenna device.

FIG. 3 illustrates a second embodiment of an antenna device 10a. In at least one embodiment, the antenna device 10a comprises a first antenna group 101a a second antenna group 102a, a first electronic switch 103a, a second electronic switch 104a, a processor 105a and a storage unit 106a. The first antenna group 101a comprises multiple antennas, each antenna can receive signal and transmit signal. The second antenna group 102a comprises multiple antennas, each antenna can receive signal and transmit signal. In the embodiment, the working principles of the first antenna group 101a, the second antenna group 102a, the first electronic switch 103a, the second electronic switch 104a and the processor 105a are the same as those of the above embodiments, and are not described herein again.

In at least one embodiment, the storage unit 106a is coupled to the processor 105a. The storage unit 106a stores a mapping relationship between the signal, the optimal radiation pattern, and the antenna combination. When a new signal is received, the processor 105a is queries the mapping relationship between the signal, the optimal radiation pattern, and the antenna combination to determine the optimal radiation pattern.

Figure 4:
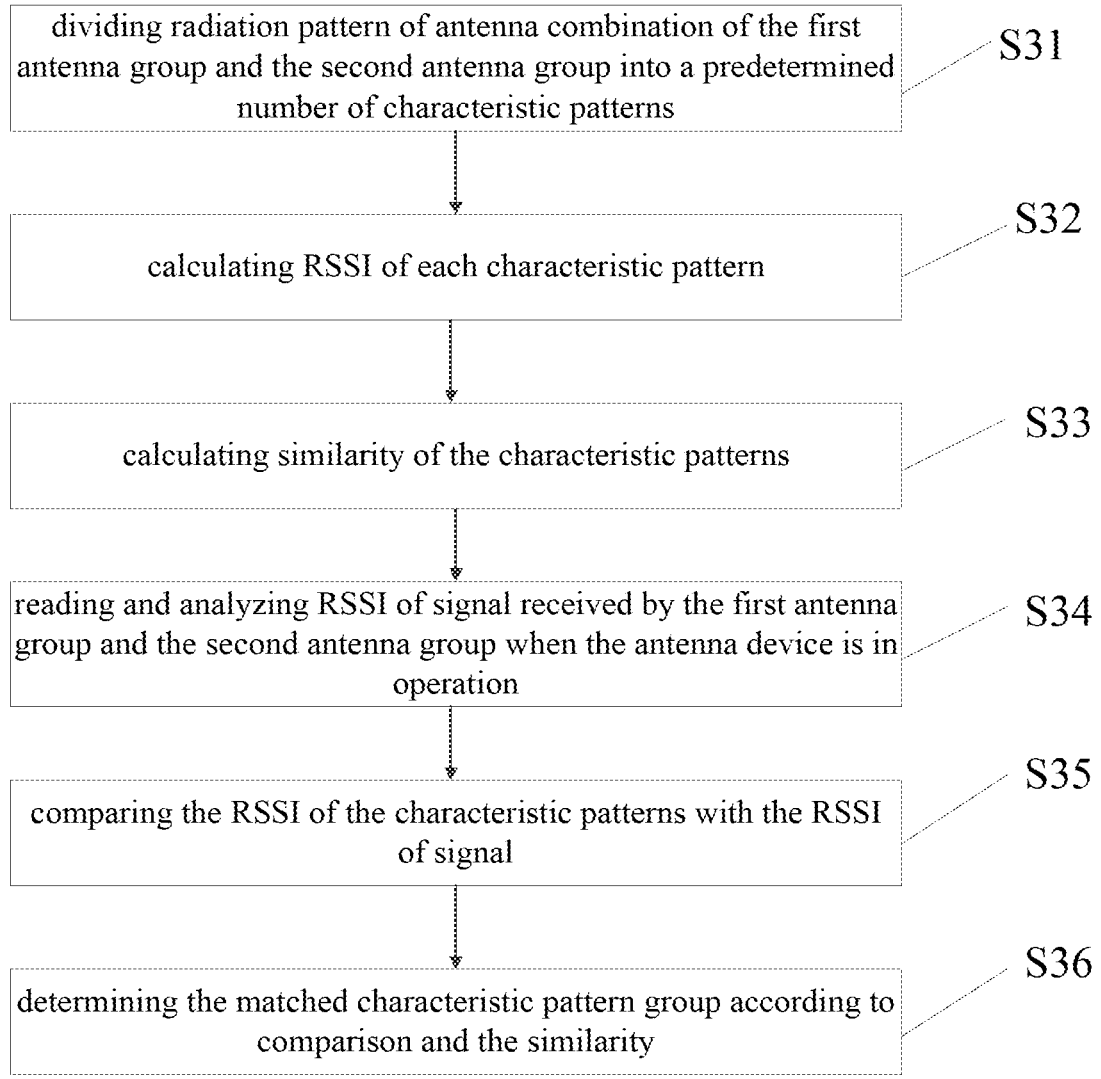
FIG. 4 is a flowchart showing a method for determining radiation patterns of a second embodiment of the antenna device.

FIG. 4 illustrates a flowchart showing a method for determining radiation pattern applied in the antenna device 10a. The antenna device 10a comprises a first antenna group 101a a second antenna group 102a, a first electronic switch 103a, a second electronic switch 104a, a processor 105a and a storage unit 106a. The first antenna group 11a comprises multiple antennas, each antenna can receive signal and transmit signal. The second antenna group 102a comprises multiple antennas, each antenna can receive signal and transmit signal. The processor 105a is coupled to the first antenna group 101a by a first electronic switch 103a, and coupled to the second antenna group 102a by a second electronic switch 104a. The method for balancing radiation comprises the following steps:

Step S31, dividing radiation pattern of antenna combination of the first antenna group 101a and the second antenna group 102a into a predetermined number of characteristic patterns.

Different antenna combinations of the first antenna group 101a and the second antenna group 102a generate different radiation patterns. For example, both the first antenna group 101a and the second antenna group 102a comprises four antennas, then will generate $(C_4^1+C_4^2+C_4^3+C_4^4)*(C_4^1+C_4^2+C_4^3+C_4^4)*4=900$ antenna combinations, that will generate 900 types of radiation pattern.

Generally, environment changes can cause deterioration of the radiation pattern, resulting in a decrease in transmission performance. Therefore the processor 105a control the first electronic switch 103a and the second electronic switch 104a to couple different antenna combination in accordance with different environment to select the optimal radiation pattern to achieve the best transmission path.

In at least one embodiment, in order to determine the optimal radiation pattern matching the current environment, the processor 105a divides the 900 types of radiation pattern into a predetermined number of characteristic patterns. In at least one embodiment, the processor 105a divides the 900 types of radiation pattern into 6 types of characteristic patterns. As shown in FIG. 2, FIG. 2 is a schematic diagram of 6 types of characteristic pattern.

Step S32, calculating RSSI of each characteristic pattern.

Step S33, calculating similarity of the characteristic patterns.

Step S34, reading and analyzing RSSI of signal received by the first antenna group 101a and the second antenna group 102a when the antenna device 10 is in operation.

Step S35, comparing the RSSI of the characteristic patterns with the RSSI of signal.

Step S36, determining the matched characteristic pattern group according to results of the comparisons and the similarities of the characteristic patterns.

In other embodiment, the processor 105a further calculates the RSRQ and RSRP of each characteristic pattern, and further reads and analyzes RSRQ and RSRP of the signals received by the first antenna group 101a and the second antenna group 102a, and compares with the RSRQ, RSRP and RSSI of the characteristic patterns, and then determines the matched characteristic pattern group according to results of the comparisons and the similarities of the characteristic patterns.

In at least one embodiment, the processor 105a further calculates a number of antenna combinations corresponding to each matched characteristic pattern. The matched characteristic pattern with the largest number of antenna combinations is the optimal radiation pattern. When the optimal radiation pattern is determined, the processor 105a controls the first electronic switch 103a to couple to corresponding antenna of the first antenna group 101a according to the optimal radiation pattern, and controls the second electronic switch 104a to couple to corresponding antenna of the second antenna group 102a according to the optimal radiation pattern.

In other embodiment, the method for determining radiation pattern further comprises following steps:

Storing a mapping relationship between the signal, the optimal radiation pattern, and the antenna combination.

Querying the mapping relationship between the signal, the optimal radiation pattern, and the antenna combination determine the optimal radiation pattern when a new signal is received.

Many details are often found in the art such as the other features of mobile terminal. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. An antenna device comprising:
a first antenna group comprising multiple first antennas, configured to receive and transmitting signals;
a second antenna group comprising multiple second antennas, configured to receive and transmitting signals;

a processor coupled to the first antenna group by a first electronic switch, coupled to the second antenna group by a second electronic switch, configured to divide radiation patterns of combinations of the antennas of the first antenna group and the second antenna group into a predetermined number of characteristic patterns, and further configured to calculate similarities of the characteristic patterns and a RSSI of each of the characteristic patterns;

wherein when the antenna device is in operation, the processor reads and analyzes RSSI of the signals received by the first antenna group and the second antenna group, and compares the RSSI of the signals of the first antenna group and the second antenna group with the RSSI of the characteristic patterns, and determines a matched characteristic pattern group according to results of comparisons and the similarities of the characteristic patterns.

2. The antenna device of claim 1, wherein the processor is further configured to read and analyze RSRQ and RSRP of the signals received by the first antenna group and the second antenna group, and compares the RSRQ and the RSRP of the signals of the first antenna group and the second antenna group with the RSRQ, the RSRP and RSSI of the characteristic patterns, and determines a matched characteristic pattern group according to results of comparisons of RSRQ, RSRP and RSSI and the similarities of the characteristic patterns.

3. The antenna device of claim 1, wherein the processor is further configured to calculate a number of combinations of the antennas corresponding to each characteristic pattern of the matched characteristic pattern group, and a matched characteristic pattern with a largest number of combinations of the antennas is determined to be an optimal radiation pattern.

4. The antenna device of claim 3, wherein the processor is further configured to control the first electronic switch to couple to corresponding antennas of the first antenna group according to the optimal radiation pattern, and control the second electronic switch to couple to corresponding antennas of the second antenna group according to the optimal radiation pattern.

5. The antenna device of claim 4, further comprising a storage unit coupled to the processor, configured to store a mapping relationship between signal, the optimal radiation pattern, and antenna combination, wherein the processor is further to query the mapping relationship between the signal, the optimal radiation pattern with a largest number of combinations of the antennas, and the combination of the antennas to determine the optimal radiation pattern when a new signal is received.

6. A method for determining radiation pattern, which is applied to an antenna device with a first antenna group comprising multiple first antennas, a second antenna group comprising multiple second antennas, a first electronic switch, a second electronic switch and a processor, the method comprising:

dividing radiation patterns of combinations of the antennas of the first antenna group and the second antenna group into a predetermined number of characteristic patterns;

calculating RSSI of each of the characteristic patterns;

calculating similarities of the characteristic patterns;

reading and analyzing RSSI of signals received by the first antenna group and the second antenna group when the antenna device is in operation;

comparing the RSSI of the characteristic patterns with the RSSI of signals of the first antenna group and the second antenna group;

determining a matched characteristic pattern group according to results of the comparison and the similarities of the characteristic patterns.

7. The method of claim 6, before the step of determining the matched characteristic pattern group according to results of the comparisons and the similarities of the characteristic patterns, further comprising:

calculating RSRQ and RSRP of each of the characteristic pattern;

reading and analyzing RSRQ and RSRP of signals received by the first antenna group and the second antenna group when the antenna device is in operation;

comparing the RSRQ, the RSRP and the RSSI of the characteristic patterns with the RSRQ, the RSRP and the RSSI of the signals of the first antenna group and the second antenna group;

determining the matched characteristic pattern group according to results of the comparisons and the similarities of the characteristic patterns.

8. The method of claim 7, further comprising:

calculating a number of the combinations of the antennas corresponding to each characteristic pattern of the matched characteristic pattern group; wherein the matched characteristic pattern with a largest number of combinations of the antennas is determined to be an optimal radiation pattern.

9. The method of claim 8, further comprising:

controlling the first electronic switch to couple to corresponding antennas of the first antenna group according to the optimal radiation pattern;

controlling the second electronic switch to couple to corresponding antennas of the second antenna group according to the optimal radiation pattern.

10. The method of claim 9, further comprising:

storing a mapping relationship between signal, the optimal radiation pattern, and the combinations of the antennas;

querying the mapping relationship between the signal, the optimal radiation pattern, and the combinations of the antennas to determine the optimal radiation pattern with a largest number of combinations of the antennas when a new signal is received.

* * * * *